V. G. OUELLETTE.
HAYRACK UNLOADER.
APPLICATION FILED AUG. 26, 1920.

1,405,862. Patented Feb. 7, 1922.

Inventor
V. G. Ouellette,

By Leyton R. Case

Attorney

UNITED STATES PATENT OFFICE.

VICTOR GILBERT OUELLETTE, OF CLODFORD, ALBERTA, CANADA.

HAYRACK UNLOADER.

1,405,862. Specification of Letters Patent. Patented Feb. 7, 1922.

Application filed August 26, 1920. Serial No. 406,197.

(GRANTED UNDER THE PROVISIONS OF THE ACT OF MARCH 3, 1921, 41 STAT. L., 1313.)

*To all whom it may concern:*

Be it known that I, VICTOR GILBERT OUELLETTE, a subject of the King of Great Britain, of the town of Clodford, Province of Alberta, Canada, have invented certain new and useful Improvements in Hayrack Unloaders, (for which I have filed application in Canada, August 19, 1919; patent issued June 15, 1920, No. 200,987), of which the following is a specification.

My invention relates to improvements in hay rack unloaders, and the object of the invention is to permit the hay rack to be unloaded from a wagon gear by one man, and without any danger of breakage, and without any appreciable labour on the part of the man, and in the following specification, I shall describe an embodiment of my invention, and the manner in which the same operates and what I claim as new will be set forth in the claims forming part of this specification.

Figure 1:
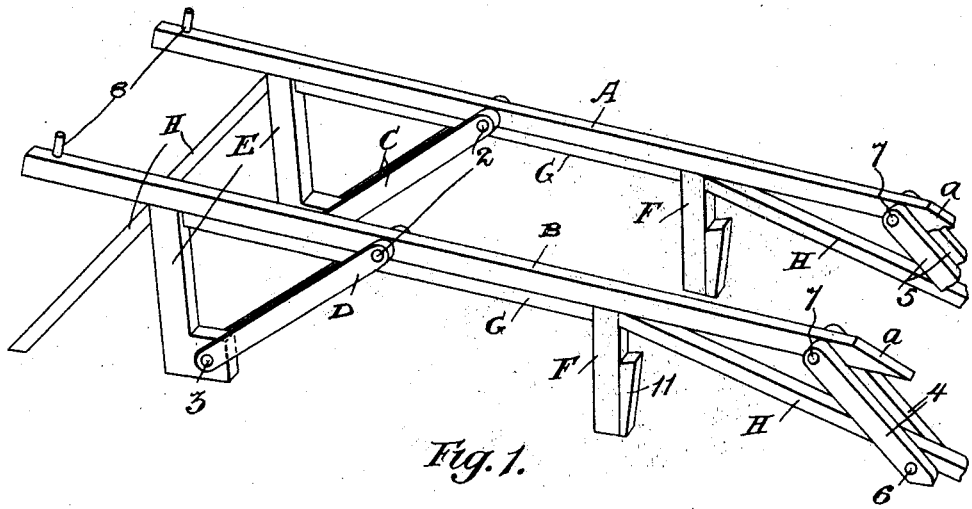
Figure 2:
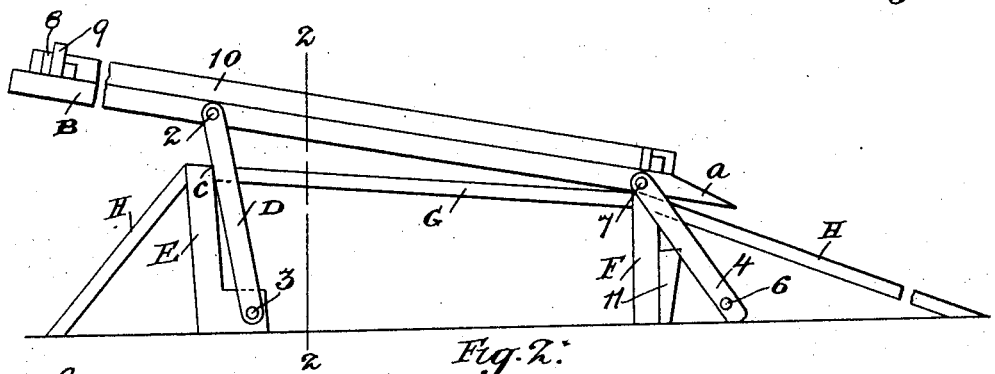
Figure 3:
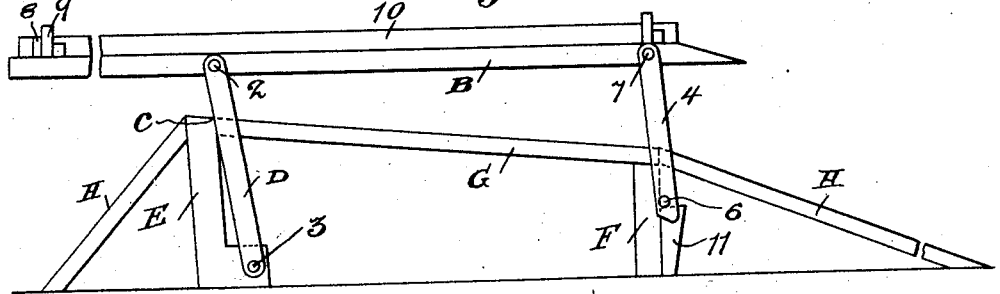
Figure 4:
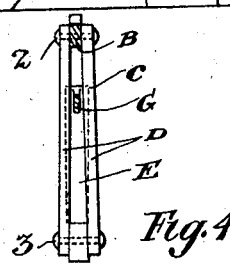

Figure 1 is a perspective view of the major portion of my preferred form of hay rack unloader, the same being positioned to receive the hay rack. Figure 2 is a side elevation of my hay rack unloader showing the same supporting the front of the hay rack above the wagon gear (not shown). Fig. 3 is a side elevation of my hay rack unloader, showing the same supporting the hay rack clear of the wagon gear (not shown), and Fig. 4 is a vertical cross section on the line 2—2, Figure 2.

In the drawings, like characters of reference refer to the same parts.

It is well-known that particularly in farm work, a hay rack frequently has to be removed from the wagon gear, and that in order to perform this work, it has heretofore been necessary to secure the labour of several men, and even then sometimes through carelessness breakage is caused. Now in putting my invention into practice, I conveniently locate and support two members or skids so associated that when the wagon is driven therebetween, in due course one end of the hay rack comes in contact with said members or skids, and as the wagon progresses, the said members or skids are raised up, thus lifting the front of the rack off the wagon gear. The said members or skids are so balanced that when the driver walks towards the upper end of the rack, the lower end of the apparatus is elevated and propped in position and the apparatus held against backward movement, thus completely lifting the rack off the wagon gear. As the driver walks towards the upper end of the rack, it will, of course, be understood that the wagon is at rest.

It will, of course, be understood that as the front end of the rack is being lifted, the back part thereof is still supported by the wagon gear so that the movement of the wagon may be transmitted to the rack for the purpose of permitting the apparatus to perform its first operation, that of partly lifting the rack off the wagon gear.

Obviously, my invention may be used to unload other objects from off a wagon gear, or sleigh, without departing from the spirit of my invention.

A and B are a pair of skids normally supported in an inclined position and having their lower ends tapered as shown at *a* to prevent the skids at this time being moved by said rack. By any suitable means such as arms C and D, the said skids are movably associated with suitable supports E near the upper portion of the apparatus. F are a pair of supports near the lower end of the apparatus, and it is upon the supports E and F that the skids A and B normally rest. The supports E and F are shown as driven into the ground, and are tied together suitably by bars G, and suitably braced by the braces H.

I prefer to pivot the arms C and D to their respective skids A and B by means of bolts 2, and I prefer to pivot the lower ends of the said arms to their respective supports E by bolts 3. Suitably associated with the lower ends of the skids A and B are suitable prop members. These prop members are preferably in pairs and are formed of bars 4 and 5 which are coupled together at their lower ends by means of bolts or rods 6, which bolts or rods are positioned underneath the braces H located at the lower end of the apparatus. The upper ends of the bars 4 and 5 are suitably associated with skids A and B to secure the required movement as by means of bolts 7. Upon referring to the drawings, it will be observed that the supports E are preferably inclined from the vertical and that the arms C and D will rest thereagainst as shown clearly in Figure 4, and prevent the skids A and B from falling when elevated. 8 are a pair of pins or other suitable stops, preferably removably carried by the skids A and B. When a wagon is driven between the said skids, the front cross member 9 of the rack 10 will come in contact with said stops, and during the continued moving of the wagon, the skids A and B will be elevated until the arms D reach the vertical, thus completely lifting the rack, except at its lower end, above the wagon gear (not shown). So soon as the forward portion of the rack is elevated the wagon is brought to rest, and then the driver walks towards the upper or forward end of the rack beyond the bolts 2, and moves the skids around these bolts, thus lifting the lower end of the rack off the wagon gear. During the movement just described, the bars 4 and 5 are raised up, and swung by gravity around their bolts 7 bringing the bolts 6 above the supports 11, which supports ultimately support said bars, as the driver walks forward to tilt the lower end of the apparatus, he moves the arms C and D out of the vertical so that when the apparatus ultimately assumes the position illustrated in Fig. 3, there will be no danger of the skinds A and B falling.

In order to replace the hay rack on the wagon gear, the wagon is run in between the skids A and B, and when properly located, the bars 4 and 5 are removed from the supports 11 and brought into the position illustrated in Fig. 2, thus lowering the rear of the rack upon the wagon gear. The wagon is then moved backward until the skids A and B are carried by the supports E and F, and then after removing the stops 8, the wagon is driven from between the skids A and B without the rack being lifted.

It will be understood by one skilled in this art, that the apparatus herein disclosed is one that can be built out of different kinds of lumber, or other suitable material, and while it will be relatively cheap to manufacture, still it will be very durable and strong.

It will be of course understood that the application of force from any convenient source may be made to tilt the apparatus so as to completely lift the rack from the skids A and B.

Any suitable means may be used to limit the movement of the arms C and D when in the position illustrated in Figs. 2 and 3. A convenient construction for this purpose consists in utilizing the corners c of the supports E as stops against which the arms C and D abut.

The construction used to illustrate my invention is merely for the purpose of illustration and is to be construed as in no wise limiting the scope of protection as set forth in the claims forming part of this specification.

What I claim is:

1. An unloading apparatus comprising two longitudinal stop-provided skids spaced laterally apart to provide an unobstructed passageway to permit a rack-provided wagon to be driven therebetween; suitable inclined forward supports and suitable rear supports whereby said skids are normally supported in an inclined position; lever mechanism pivoted to said skids near their upper portions and adapted to permit said skids, when said wagon comes in contact with said stops, to be raised upwardly and supported at an inclined position at their forward portions, and lift the forward part of the rack from off the wagon gear, the said lever mechanism resting against said inclined supports; props pivoted at their upper ends to said skids near their lower ends, and supports adapted to receive the lower ends of said props when force is applied to said skids beyond the point of association of said lever mechanism therewith whereby the lower ends of said skids are raised to lift the rear end of said rack clear of the wagon gear and supported in raised position.

2. An unloading apparatus comprising two longitudinal skids spaced laterally apart to provide an unobstructed passageway to permit a rack-provided wagon to be driven therebetween; suitable removable stops carried by the said skids near their upper ends; suitable inclined forward supports and suitable rear supports whereby said skids are normally supported in an inclined position; lever mechanism pivoted to said skids near their upper portions and adapted to permit said skids when said wagon comes in contact with said stops against said stops to be raised upwardly and supported at their forward portions, and lift the forward part of the rack from off the wagon gear, the said lever mechanism resting against said inclined supports; props pivoted at their upper ends to said skids near their lower ends, and supports adapted to receive the lower ends of said props when force is applied to said skids beyond the point of association of said lever mechanism therewith whereby the lower ends of said skids are raised to lift the rear end of said rack clear of the wagon gear and supported in raised position.

VICTOR GILBERT OUELLETTE.

Witness:
Wm. M. Lee.